United States Patent [19]

Hrdlicka et al.

[11] 4,085,437
[45] Apr. 18, 1978

[54] LIGHTED FISHING POLE

[76] Inventors: Theodore Frederick Hrdlicka; Floyd Stafford, both of 143 S. Windsor Dr., Denver, Colo. 80219

[21] Appl. No.: 706,833

[22] Filed: Jul. 19, 1976

[51] Int. Cl.² .............................................. F21V 33/00
[52] U.S. Cl. ...................................... 362/109; 43/17.5
[58] Field of Search ............................ 240/6.4 F, 6.46; 43/17.5; 362/102, 109, 119, 120

[56] References Cited

U.S. PATENT DOCUMENTS

| | | | |
|---|---|---|---|
| 2,646,640 | 7/1953 | George | 240/6.4 F X |
| 2,706,769 | 4/1955 | Cook | 240/6.46 |
| 2,773,974 | 12/1956 | Markett | 240/6.46 |
| 3,074,196 | 1/1963 | Bronson | 240/6.4 F X |

Primary Examiner—Fred L. Braun
Attorney, Agent, or Firm—Marden S. Gordon

[57] ABSTRACT

An elongated cylindrical handle constructed of transparent material, such as clear plastic, containing a flashlight-type mechanism for illuminating the handle which is attachable to a fishing pole so as to provide an illumination device integral with a fishing pole for use in changing tackle, baiting a fishing hook, enticing fish, or accessory lighting by a fisherman during dark periods of the day. The handle is detachable from the fishing pole to provide commpactness for storage or handling and so that the handle can be illuminated with the fishing pole attached or, on the other hand, the handle can be used as an ordinary flashlight with the fishing pole removed.

1 Claim, 4 Drawing Figures

U.S. Patent    April 18, 1978    4,085,437
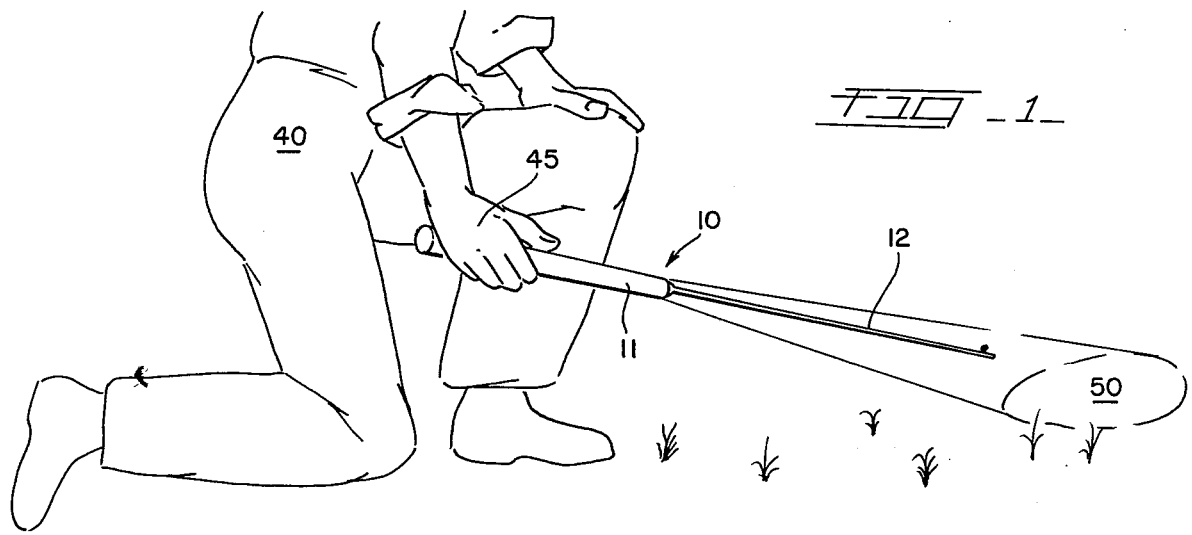
FIG. 1
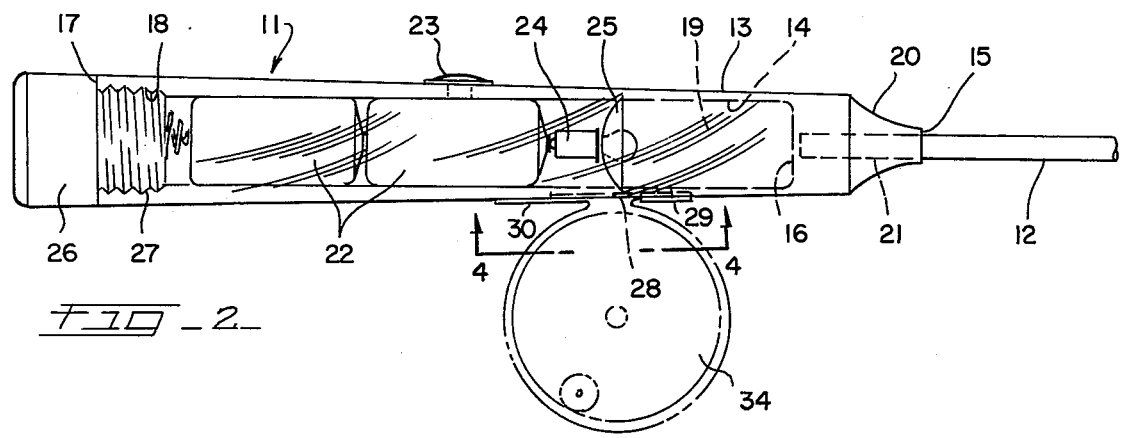
FIG. 2
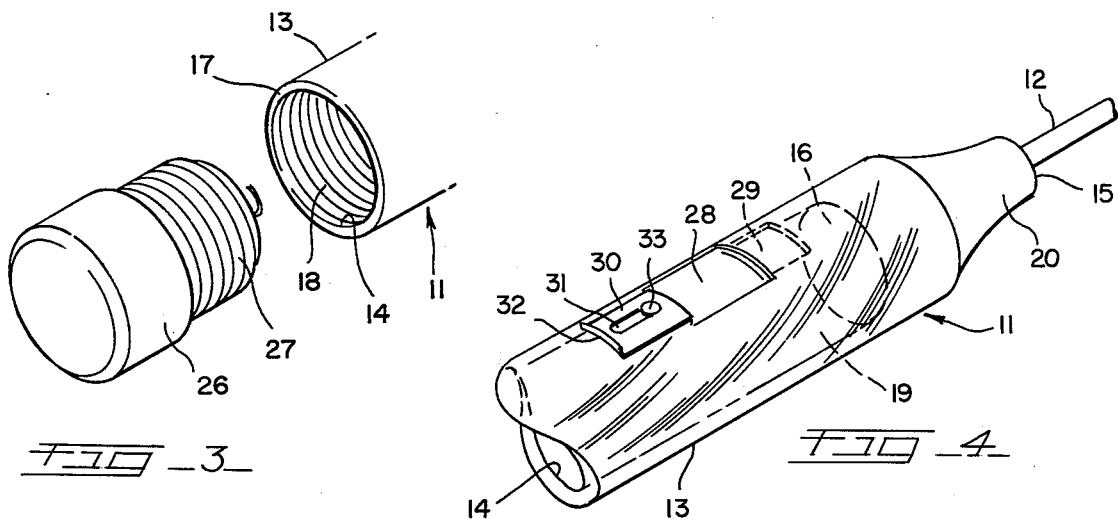
FIG. 3
FIG. 4

LIGHTED FISHING POLE

BACKGROUND OF THE INVENTION

1. Field of the Invention

This invention relates to a lighted fishing pole with illumination means provided in the fishing pole handle for use by a fisherman in providing light during dark hours of the day.

2. Description of the Prior Art

One of the fastest growing outdoor recreational sports today is fishing. Since many fish feed primarily between sunset and sunrise, successful fisherman often fish during dark periods of the day. Consequently, some form of illumination is generally necessary to change tackle on a fishing line, to bait a hook, or for other lighting purposes. The most common methods used for these purposes include the use of a campfire, a separately carried flashlight, a lantern, or the like, these methods thereby requiring a fisherman to leave the fishing spot or to separately carry some kind of illumination implement in order to perform given functions or to find one's way around after dark. Many devices are available to provide a signaling light mountable on a fishing pole for notifying a fisherman of a bite, but nothing is provided wherein an illumination means is integrally built into the handle of a fishing pole. Examples of lighted signaling means include U.S. Pat. No. 3,364,610 issued to Poole Jan. 23, 1968 which describes a fishing and continuity light, and U.S. Pat. No. 3,882,629 issued to Kaye May 13, 1975 which illustrates a fishing rod signal light. U.S. Pat. No. 2,738,609 issued to Reed Mar. 20, 1956 relates to an illuminated fishing float by which a fisherman may conduct his fishing activities after dark, but such devices restrict the illumination means to a distance over the water away from the fisherman and are not convenient for other lighting purposes. There is, then, an obvious need in the marketplace for an illumination means integrally contained within the handle of a fishing pole for the purposes indicated above.

SUMMARY OF THE INVENTION

The present invention provides a lighted fishing pole with an illumination means integrally contained in the fishing pole handle for use by a fisherman in performing fishing activities during dark periods of the day, attracting fish by means of light, or for accessory lighting purposes.

It is a feature of the present invention to provide a lighted fishing pole.

A further feature of the present invention provides a lighted fishing pole which is portable and easy to use and reliable and efficient in operation.

Yet still a further feature of the present invention provides a lighted fishing pole which is of a rugged and durable construction and which, therefore, may be guaranteed by the manufacturer to withstand long usage.

An additional feature of the present invention provides a lighted fishing pole which is simple in construction and which, therefore, may be produced by a manufacturer at an economical cost so as to encourage widespread usage thereof.

Other features of this invention will be apparent during the course of the following description.

BRIEF DESCRIPTION OF THE DRAWINGS

In the accompanying drawings forming a part of this specification. and in which like reference characters are employed to designate like parts throughout the same:

FIG. 1 is a perspective view of the lighted fishing pole held by a fisherman to illuminate an area on the ground; and FIG. 2 is a side sectional view of the lighted fishing pole handle; and FIG. 3 is a perspective view of the tip of the lighted handle; and FIG. 4 is a partial sectional view of the bottom of the fishing pole handle showing one of the clamping means for a fishing reel.

DESCRIPTION OF THE PREFERRED EMBODIMENT

Referring now to the drawings in detail, there is illustrated a preferred form of the lighted fishing pole constructed in accordance with the principles of the present invention and which is designated generally in its entirety by the reference numeral 10 and which is comprised of a lighted handle 11, a detachable pole 12, and associated hardware and interconnecting components as will be later described.

The lighted handle 11 is constructed of durable transparent material, such as clear or lightly colored plastic, and is generally cylindrical in configuration having an outside surface 13 and an opposed inside surface 14, a front outside end surface 15 and an opposed front inside end surface 16, a rear end surface 17 with a round threaded through hole 18 provided a short distance from the rear end surface 17 along the inside surface 14 to provide the interior compartment 19 running along the length of the lighted handle 11 from the rear end surface 17 to the front inside end surface 16. As shown in FIGS. 2 and 4, the front outside end surface 15 is smaller in diameter than the front inside end surface 16 due to the taper on the outside surface 13 as shown by the reference numeral 20, with a round hole 21 being located centrally on the front outside end surface 15 and extending therefrom to a short distance frontwardly of the front inside end surface 16. A conventional waterproof flashlight-type assembly is contained within the interior compartment 19, is affixed therein in any conventional way, and includes one or more flashlight-type batteries 22, and on-off switch 23, a flashlight bulb 24, a lens 25, and a threaded cap 26 provided with external threads 27 for threadable engagement or disengagement of the cap 26 in the round threaded hole 18 to provide a water tight fit between the cap 26 and the rear end surface 17 when the external threads 27 are tightened within the hole 18. As shown by the numbers 4—4 in FIG. 2, the outside surface 13 of the lighted handle 11 is provided with a rectangular slot 28 running lengthwise along the length of the outside surface 13 and disposed a short distance rearwardly from the front inside end surface 16, with the slot 28 projecting without the outside surface 13 and about half the distance between the outside surface 13 and the inside surface 14, the slot 28 further being contiguous to the rectangular groove 29 displaced between the outside surface 13 and the inside surface 14 and running a short distance forwardly from the rectangular slot 28. A slidable rectangular bracket 30, provided with a rectangular through slot 31 centrally along its length and a raised flange 32 along the rear edge of the slidable bracket 30, is slidably attached to the outside surface 13 by means of a pin 33 in a conventional way, with the bracket 30 being located adjacent the rear edge of the rectangular slot 28 so as to be slidable over or away from the slot 28, a conventional fishing reel 34 being affixable in a conventional way within the slot 28 by assembling one leg (not shown) of the reel 34 within the groove 29 and with the other leg (also not shown) being affixed within the slot 28 by sliding the bracket 30 thereover.

The detachable pole 12 is a conventional cylindrical fishing rod of durable or flexible material with an outside diameter on one end to provide a snug fit for placement thereof within the round hole 21 on the lighted handle 11.

In operation, the detachable pole 12 would be inserted, as shown in FIG. 2, within the round hole 21 on the lighted handle 11 and with the reel 34 affixed within the slot 28 and the groove 29 interlocked therein by means of the slidable bracket 30 in order to provide an extended fishing pole in a conventional manner. The pole 12 and the reel 34 would be disassembled from the lighted handle 11 for carrying or storage purposes by reversing the above described procedure. The lighted handle 11 could be used as a flashlight with the detachable pole 12 either affixed therein or disassembled therefrom, with a fisherman 40 grasping the lighted handle 11 within one hand 45 and with the thumb of the hand 45 resting on the on-off switch 23, and operating the switch 23 in a conventional way to eject a beam of light 50 on the ground, on water, or simply in the area of the pole 12 to provide an illumination source for changing tackle, baiting a hook, lighting an area on the ground, or projecting a light beam on the water to attract fish. The batteries 22 or the bulb 24 can be replaced within the lighted handle 11 similarly to the operation of a conventional flashlight by threadably disengaging the cap 26, removing the batteries 22 and bulb 24 and replacing them with new ones, and replacing the cap 26 by threadably engaging the external threads 27 within the threaded hole 18.

There is thus described a lighted fishing pole which meets all of its stated objectives and overcomes the disadvantages of existing methods wherein a separate flashlight or other illumination device must be carried to provide a light source for fishermen during dark periods of the day.

It is to be understood that the form of this invention as shown and described is to be taken as a preferred example thereof, and that this invention is not to be limited to the exact arrangement of parts described in the description or illustrated in the drawings as changes thereto in the details thereof pertaining to size, shape and arrangement of parts thereof are envisioned within the scope of the invention without departing from the novel concepts of the invention.

Having thus described the invention, what is claimed is:

1. A combination flashlight and fishing pole intended for use by fishermen and the like to provide selective illumination during evening hours, the device comprising, in combination:

an elongated tubularly shaped rod manufactured of flexible material and having a front end and a back end;

an axially elongated cylindrical handle member of a diameter greater than the rod, the handle member having a cylindrical outer surface, a flat back end surface, and a conically outwardly tapered front end surface of a truncated configuration;

the handle member being manufactured of a durable transparent plastic material permitting illumination to pass freely therethrough;

an axially elongated cylindrical opening disposed in the handle member front end surface along the axis thereof, the opening extending inwardly of the handle member from the truncated portion of the front end surface, the opening being of a diameter to snugly receive the back end portion of the rod therein with the rod being readily detached from the handle member;

an axially elongated cylindrically shaped compartment formed integrally in the handle member rearward of the front end surface and opening out of the back end surface, the compartment having a front end, an open back end, and interior cylindrical wall surfaces;

a series of screw threads formed integrally with the compartment wall surfaces immediately adjacent the compartment back end and extending inwardly of the compartment;

a cylindrically shaped cap member having a cylindrical head portion of the same exterior diameter as the handle member at its back end surface, and a body portion of a reduced diameter extending axially from the head portion and adapted to be received in the compartment, screw threads being formed integrally with the cylindrical outer surface of the body portion to be threadedly received in the threaded portion of the compartment to form a watertight seal therewith upon the cap member being threaded onto the handle member to close the compartment;

a lens member disposed in the compartment perpendicular to the axis thereof and spaced rearwardly of the compartment front end;

a low voltage electrical bulb associated with the lens member and mounted in the compartment in a manner to project light forwardly of the compartment when energized;

an electrical storage type battery mounted in the compartment for selectively energizing the bulb;

an electrical switch mounted in the compartment and having a portion thereof projecting outwardly of the interior wall surface and exteriorly of the handle member for selective movement between an "on" and "off" position for selectively energizing and de-energizing the bulb to control the illumination projected thereby;

an elongated rectangular slot formed in the exterior surface of the handle member and extending longitudinally therealong, the slot having a leading edge and a trailing edge and opposed side edges;

an elongated rectangular groove formed immediately beneath the exterior surface of the handle member having one end contiguous with the leading edge of the slot, the groove extending longitudinally therefrom;

a longitudinally elongated rectangular bracket of a cross-section configuration having a curvature matching the curvature of the handle member, the bracket being of a width approximating the width of the slot, the bracket having a leading edge and a trailing edge, a raised flange formed integrally with the trailing edge, and an axially extending slot formed in the bracket intermediate the leading and trailing edges;

a fixed pin mounted to the handle member adjacent the slot trailing edge and along the axis thereof, the pin projecting outwardly of the handle member to be slidably received in the bracket slot for guiding the sliding movement of the bracket relative to the handle member from an operative position over a portion of the slot to an inoperative position free of the slot and overlying the handle member;

the slot, groove, and bracket cooperating with each other in a manner to readily attach and detach a conventional type fishing reel to the handle member;

whereby the handle member provides a selectively controlled flashlight illumination means with the detachable pole affixed therein for fishing while performing fishing activities, and with the handle member being usable as a conventional flashlight with the detachable rod removed therefrom.

* * * * *